United States Patent [19]

Henderson et al.

[11] 4,031,768

[45] June 28, 1977

[54] ENDLESS POWER TRANSMISSION BELT STRUCTURE

[75] Inventors: Dewey D. Henderson; Jerry W. Rogers; Gerald C. Hollaway, Jr., all of Springfield, Mo.

[73] Assignee: Dayco Corporation, Dayton, Ohio

[22] Filed: June 18, 1976

[21] Appl. No.: 697,801

[52] U.S. Cl. .................................. 74/233; 74/234
[51] Int. Cl.² ....................... F16G 5/00; F16G 5/16
[58] Field of Search .................. 74/234, 233, 231 P

[56] References Cited

UNITED STATES PATENTS

| 3,416,383 | 12/1968 | Jensen et al. | 74/233 |
| 3,863,516 | 2/1975 | Fisher et al. | 74/233 |
| 3,987,684 | 10/1976 | Fisher et al. | 74/233 |

FOREIGN PATENTS OR APPLICATIONS

| 949,316 | 8/1949 | France | 74/234 |

Primary Examiner—Leonard H. Gerin
Attorney, Agent, or Firm—Reuben Wolk

[57] ABSTRACT

A substantially trapezoidal endless belt structure having reduced coefficient of friction raw-edged non-parallel sides is provided and comprises a tension section, a compression section, and load-carrying means disposed between the sections with each of such sections being made of an elastomeric compound having antifriction properties which reduce the coefficient of friction of such sides.

7 Claims, 4 Drawing Figures

ENDLESS POWER TRANSMISSION BELT STRUCTURE

BACKGROUND OF THE INVENTION

So-called raw-edged endless substantially trapezoidal power transmission belts are often used in torque sensing drives, in applications where each belt is maintained under spring tension, or the like; and, it has been found that a high belt to sheave coefficient of friction results in a comparatively high total belt tension and a reduced belt to sheave coefficient of friction results in a reduced total belt tension. Accordingly, it is desirable in drives and applications of the character mentioned to provide a raw-edges belt, i.e., one having raw-edge non-parallel sides, which is capable of operating under reduced belt tension due to its reduced coefficient of friction non-parallel sides.

SUMMARY

It is a feature of this invention to provide a simple and economical substantially trapezoidal so-called raw-edged endless power transmission belt structure which is particularly adapted to be used in drives and applications of the character mentioned.

Another feature of this invention is to provide an endless belt structure of the character mentioned having raw-edged sides which have a reduced coefficient of friction.

Another feature of this invention is to provide an endless substantially trapezoidal power transmission belt structure having reduced coefficient of friction raw-edged non-parallel sides comprising a tension section, a compression section, and load-carrying means disposed between the sections with each of the sections being made of an elastomeric compound having antifriction properties which reduce the coefficient of friction of the sides.

Accordingly, it is an object of this invention to provide an endless power transmission belt structure having one or more of the novel features set forth above or hereinafter shown or described.

Other details, features, objects, uses and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
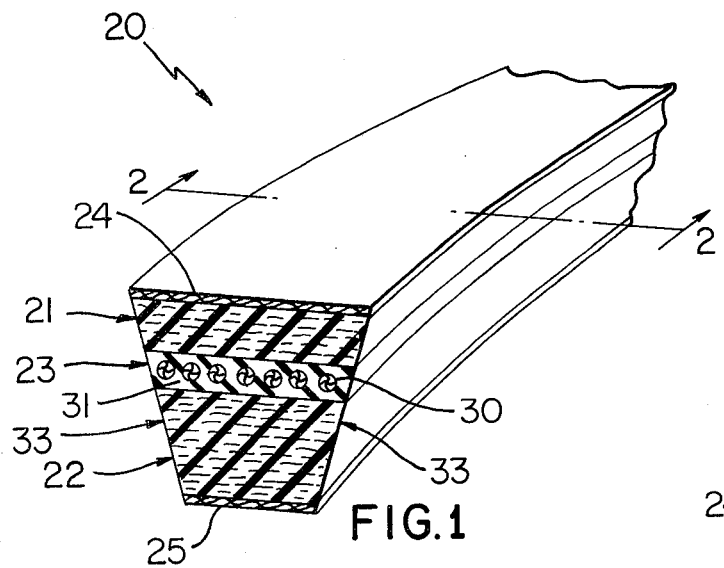
FIG. 1 is a fragmentary perspective view illustrating one exemplary embodiment of an endless power transmission belt structure of this invention.

Reference is now made to FIG. 1 of the drawing which illustrates an exemplary embodiment of an endless substantially trapezoidal power transmission belt structure or belt of this invention which is designated generally by the referrence numeral 20. The belt 20 is particularly adapted to be used in associated sheaves in accordance with techniques known in the art, such as machined metal sheaves including so-called gray iron sheaves, and has reduced coefficient of friction non-parallel sides and the magnitude of such reduced coefficient of friction will be discussed in more detail subsequently. The belt 20 is particularly adapted to be used in so-called torque sensing drives, application where shock loads of varying belt tension are imposed on the belt, applications where the belt is operated at variable speeds, applications where the belt is spring loaded to control its tension, and the like.

The belt 20 comprises a tension section 21, a compression section 22, and a load-carrying section 23 disposed between the tension section 21 and compression section 22. The belt 20 also has an outside ply or layer of fabric 24 and an inside ply or layer of fabric 25. Each fabric layer 24 and 25 may be made from a non-woven, woven, or knitted fabric; and each layer 24 and 25 is frictioned with an elastomeric material which is selected to assure the layer is bonded to its associated section in a tenacious manner.

The load-carrying section 23 has load-carrying means in the form of a helically wound load-carrying cord 30 which is suitably embedded in an elastomeric cushion or matrix 31 in accordance with techniques which are well known in the art. The helically wound cord 30 may be made of any suitable material known and used in the art.

Figure 2:
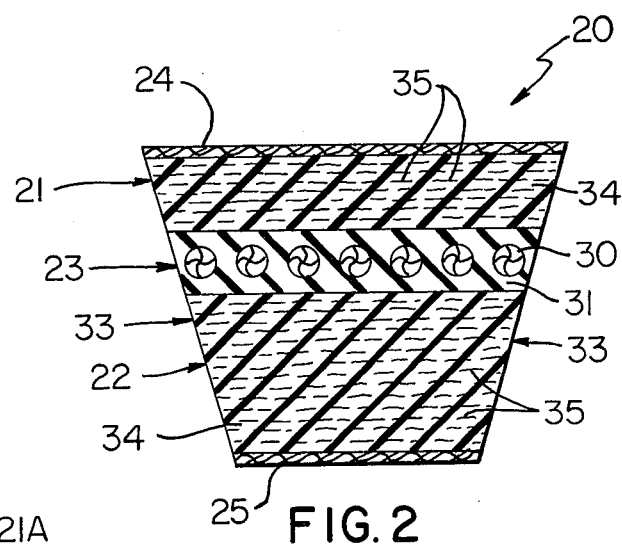
FIG. 2 is an enlarged cross-sectional view taken essentially on the line 2—2 of FIG. 1.

Each of the tension section 21 and compression section 22 is made of an elastomeric compound having antifriction properties which reduce the coefficient of friction of the non-parallel sides of the belt and such non-parallel sides are designated generally by the same reference numeral 33. The elastomeric compound which is used to define the sections 21 and 22 is in the form of an elastomeric matrix 34 which as best seen in FIG. 2 has a plurality of randomly arranged fibers embedded therein with their axes disposed substantially transverse, perpendicular in this example, the longitudinal axis of the belt 20 and a representative few of such fibers are each designated by the same reference numeral 35. The fibers 35 may be made of any suitable material and are preferably non-metallic fibers such as cotton fibers or fibers made of a suitable synthetic material. Each fiber 35 may have a diameter ranging between 0.001 inch and 0.050 inch and a length ranging between 0.001 inch and several inches. It will also be appreciated that the fibers 35 may be made of blends or mixtures of various types of fibers.

The belt 20 comprises any suitable elastomeric material preferably in the form of a polymer as part of its elastomeric matrix 34 and employs graphite to provide most of the anti-friction properties thereto. In one exemplary application of the belt from 15 to 90 parts by weight of graphite were eployed for each 100 parts by weight of polymer. Further, in some applications of this invention roughly 2 parts by weight of stearic acid may be employed for each 100 parts by weight of polymer in addition to the graphite in the quantities mentioned above to help improve the lubricating qualities of the belt.

The fibers 35 used in the belt 20 serve to increase the strength of such belt 20 and particularly its transverse stiffness or rigidity. The amount of fibers 35 which may be used may range between 10 and 50 parts by weight of fibers for each 100 parts by weight of polymer in applications where the graphite used may vary between 15 and 90 parts by weight for each 100 parts of polymer.

Having described the exemplary belt 20, the following Table I is presented as typical of the elastomeric compound defining the tension and compression sections 21 and 22 and having transverse stiffness and antifriction properties which reduce the coefficient of friction of the sides 33 of the belt 20.

TABLE I

| MATERIAL | PARTS BY WEIGHT |
| --- | --- |
| Polymer | 100.00 |
| Graphite | 15.00 – 90.00 |
| Reinforcing Filler | 0 – 50.00 |
| Process Oil | 5.00 |
| Antioxidant | 2.00 |
| Magnesium Oxide | 4.00 |
| Stearic Acid | 2.00 |
| Chopped Fibers | 10.00 – 50.00 |
| Zinc Oxide | 5.00 |
| Accelerator | 0.25 |

Figure 3:
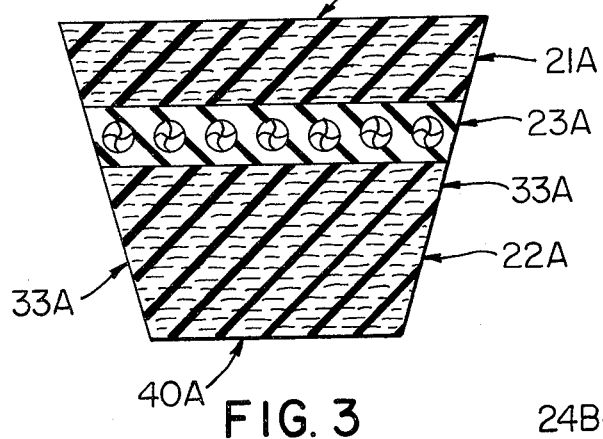
FIG. 3 is a view similar to FIG. 2 illustrating another exemplary embodiment of the belt of this invention.
Figure 4:
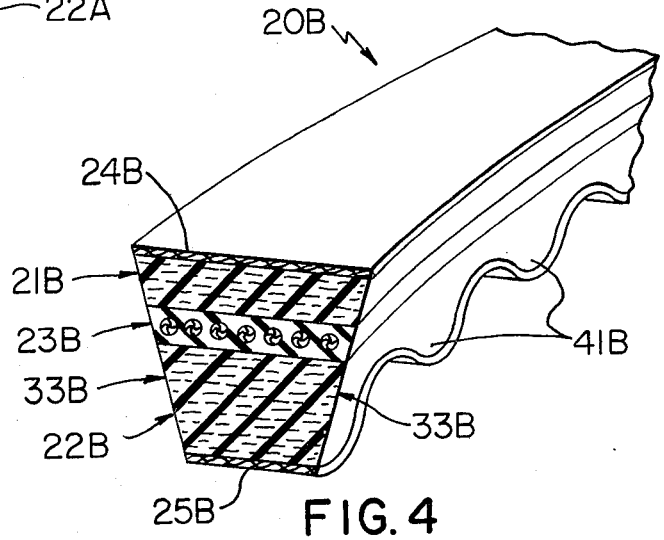
FIG. 4 is a fragmentary perspective view similar to FIG. 1 illustrating another exemplary embodiment of an endless power transmission belt structure of this invention.

Other exemplary embodiments of the belt structure or the belt of this invention are illustrated in FIGS. 3 and 4 of the drawing. The belts illustrated in FIGS. 3 and 4 are very similar to the belt 20; therefore, such belts will be designated by the reference numerals 20A and 20B respectively and representative parts of each belt which are similar to corresponding parts of the belt 20 will be designated in the drawing by the same reference numerals as in the belt 20 (whether or not such representative parts are mentioned in the specification) followed by the letter designation A or B and not described again in detail. Only those component parts of each belt which are different from corresponding parts of the belt 20 will be designated by a new reference numeral also followed by the associated letter designation and described in detail.

The trapezoidal belt 20A of FIG. 3 has a tension section 21A, a compression section 22A, and a load-carrying section 23A, and opposed symmetrically arranged raw-edged non-parallel sides 33A. The tension and compression sections are each made of an elastomeric compound having antifriction properties and having strengthening fibers therein; however, it will be seen that the belt 20A is free of both inside and outside fiber layers as shown at 40A.

The trapezoidal belt 20B of FIG. 4 has a tension section 21B, a compression section 22B, and a load-carrying section 23B. The belt 20B also has opposed symmetrically arranged raw-edged non-parallel sides 33B and each of the tension and compression sections is made of an elastomeric compound having antifriction properties and strengthening fibers embedded therein as previously described. The belt 20B also has an outside ply or layer of fabric 24B and an inside ply or layer of fabric 25B; and, the fabric layers 24B and 25B are made of any suitable fabric.

The main difference between the belt 20B and the belt 20, is that the belt 20B has a compression section 22B which has an outer portion provided with a toothed configuration defined by a plurality of rounded teeth 41B whereby the inside fabric layer 25B of this example extends in a smooth undulating path; however, it is to be understood that the compression section may have an outer portion defined by a plurality of so-called square or sharp-cornered teeth.

Reference was made in FIG. 1 to the use of a polymer in the elastomeric compound having antifriction properties and it is to be understood that such polymer may be any natural or synthetic rubber and may include neoprene rubber, styrene-butadiene (SBR), polybutadiene, or any desired combination of these polymers.

Reference was also made to the fact that the elastomeric compound has antifriction properties which reduce the coefficient of friction of the sides of the belt of the invention, and this reference to reduced coefficient of friction is intended to cover the situation where such coefficient of friction is within the range of 0.25 to 0.40 when operating the belt of this invention in machined metal sheaves such as so-called gray iron V-grooved sheaves. Further, coefficient of friction is defined as the ratio of the tangential force that is needed to start or to maintain uniform relative motion between two contacting surfaces to the perpendicular force holding them in contact.

While present exemplary embodiments of this invention, and methods of practicing the same, have been illustrated and described, it will be recognized that this invention may be otherwise variously embodied and practiced within the scope of the following claims.

What is claimed is:

1. An endless substantially trapezoidal power transmission belt structure having reduced coefficient of friction raw-edged non-parallel sides comprising, a tension section, a compression section, and load-carrying means disposed between said sections, each of said sections being made of an elastomeric compound comprising a polymer and graphite, said compound having anti-friction properties which reduce the coefficient of friction of said sides, said graphie comprising 15–90 parts by weight for each 100 parts by weight of said polymer.

2. A belt structure as set forth in claim 1 in which said elastomeric compound is further comprised of roughly 2 parts by weight of stearic for each 100 parts by weight of polymer.

3. A belt structure as set forth in claim 1 in which said elastomeric compound is further comprised of from 10 to 50 parts by weight of strengthening fibers for each 100 parts by weight of polymer.

4. A belt structure as set forth in claim 3 in which said load-carrying means is comprised of a helically wound load-carrying cord and further comprising a fabric layer defining the inside surface of said belt structure and a fabric layer defining the outside surface of said belt structure.

5. A belt structure as set forth in claim 3 in which each of said strengthening fibers is disposed substantially transverse the longitudinal axis of said belt structure and increases the transverse stiffness thereof.

6. A belt structure as set forth in claim 5 in which each of said fibers has a diameter ranging between 0.001 inch and 0.050 inch and a length ranging between 0.001 inch and several inches.

7. A belt structure as set forth in claim 3 in which said compression section has a plurality of integral teeth defining its outer portion.

* * * * *

UNITED STATES PATENT OFFICE
CERTIFICATE OF CORRECTION

PATENT NO. : 4,031,768
DATED : June 28, 1977
INVENTOR(S) : Dewey D. Henderson; Jerry W. Rogers; Gerald C. Hollaway, Jr.

It is certified that error appears in the above-identified patent and that said Letters Patent are hereby corrected as shown below:

Col. 1, line 15 - "edges" should be -- edged --

Col. 4, line 37 - "graphie" should be -- graphite --

Col. 4, line 42 - after the word "stearic" insert -- acid --

Signed and Sealed this

Twenty-fifth Day of October 1977

[SEAL]

Attest:

RUTH C. MASON
Attesting Officer

LUTRELLE F. PARKER
Acting Commissioner of Patents and Trademarks